2,702,798

ALKALI METAL SILICATES AS STABILIZERS FOR LOW TEMPERATURE SYNTHETIC RUBBER LATICES

John E. Burleigh and Sig C. Fauske, Borger, Tex., assignors to Phillips Petroleum Company, a corporation of Delaware No Drawing. Application September 17, 1951,
Serial No. 247,021

2 Claims. (Cl. 260—84.1)

This invention relates to an improved process for polymerizing unsaturated hydrocarbons dispersed in an aqueous emulsion. In one of its more specific aspects this invention relates to polymerizing an aliphatic conjugated diene hydrocarbon, including substituted derivatives, in admixture with a monomer copolymerizable therewith, to form long chain polymerization products of the type known as synthetic rubber. In another of its more specific aspects this invention relates to recipes for effecting the production of synthetic rubber by low temperature emulsion polymerization of conjugated diolefins. This invention also relates to the low temperature emulsion polymerization of conjugated diolefins in which organic peroxides and water-soluble ferrous complexes are used.

In the low temperature emulsion polymerization of unsaturated hydrocarbons in the presence of an organic peroxide and a ferrous complex one disadvantage, when the process is used in plant operation, is that an appreciable quantity of precoagulum is frequently formed, and the latex is unstable to the extent that the precoagulum which forms plugs pumps, strainers and lines in the recovery area.

It is an object of this invention to prevent precoagulation in low temperature emulsion polymerization processes in which the monomers are polymerized in the presence of an organic peroxide and a water-soluble ferrous complex.

Another object of this invention is to produce a synthetic rubber by the polymerization of a polymerizable monomeric material in aqueous emulsion at temperatures lower than are ordinarily used.

Another object of this invention is to provide an improved process for polymerizing butadiene, while dispersed in water, to produce a polymer which can be easily processed and which has other desirable properties.

Other objects will be apparent to those skilled in the art upon reading the accompanying disclosure and discussion.

The problem of stabilizing low temperature synthetic rubber latices against precoagulation is recognized by Shearon, McKenzie and Samuels who point out in Industrial and Engineering Chemistry, vol. 40, No. 5, page 769, that low temperature latex appears to have less mechanical stability than either GR-S or GR-S-10, and that pH maintenance is very critical since it has been observed that pH plays an important part in controlling the particle size of the precoagulum.

In polymerization systems in which an organic peroxide and a ferrous complex are used, a relatively high pH is desirable, such as 10 or greater. Adjustment of pH in the initial stages of the reaction is readily accomplished by the addition of an alkali metal hydroxide to the soap solution when the ingredients are charged to the reactor. However, as polymerization proceeds, and also during venting, stripping, and storing of the latex, the pH drops considerably, and with this drop in pH there is generally a decrease in the stability of the latex resulting in precoagulation. It is desirable that a latex stabilizer be provided which will make it possible to maintain a high pH both during and subsequent to polymerization thus preventing precoagulation. Fatty acid soaps have been found to produce such stabilizing effects but these materials are often undesirable since the fatty acid which is left in the polymer is in many instances deleterious.

Sodium silicates are known to the synthetic rubber industry, and they have been used for increasing the solids concentration of creams, and also for alleviating the reactivity of synthetic rubber due to the presence of other materials in the rubber such as, catalysts, activators, or, to the existence of linkages where oxidation, hydrolysis or some other chemical reaction may occur. In an entirely dissimilar operation it is our unobvious discovery that in emulsion polymerization processes which comprise polymerizing in an iron pyrophosphate activated system a monomeric material usually comprising a major amount of a conjugated diolefin and a minor amount of a monomer copolymerizable therewith, precoagulation can be prevented by the step of adding an alkali metal silicate prior to coagulation. Broadly, in accordance with this invention precoagulation can be prevented in a low temperature emulsion polymerization process which comprises polymerizing, in aqueous emulsion and in the presence of an organic peroxide and a water-soluble ferrous complex, a liquid monomeric material comprising unsaturated organic compounds having an active $CH_2=C<$ group and polymerizable while dispersed in an aqueous medium if an alkali metal silicate is present as a stabilizer. The term "water-soluble ferrous complex" includes any of the well known complexing agents normally combined with ferrous iron in emulsion polymerization processes. Examples of known complexing agents forming water-soluble ferrous complexes are inorganic complexing agents such as pyrophosphates and organic complexing agents, e. g. 2,2'-dipyridyl, 2-(2'-pyridyl)quinoline, o-phenathroline, 2,2'2''-terpyridine, ethylenediamine tetra acetic acid (ethylene dinitrilo tetra acetic acid), alkali metal salts of ethylenediamine tetra acetic acid, nitrilo triacetic acid, citrates, salicylates and lactates.

Stabilization against precoagulation is effected by incorporating the alkali metal silicate, in an amount sufficient to prevent precoagulation, into the polymerization recipe with the initial charge of ingredients, or, if desired, it may be added during the course of the polymerization. An alternative method is to introduce the silicate into the latex subsequent to polymerization, preferably at blowdown, although it may be added later. If added later the alkali metal silicate is effective for storage purposes but optimum results are realized if it is introduced either into the polymerization recipe or at least prior to venting and stripping. It is our discovery that once the pH of a polymerization system is established, very little change occurs during the reaction or the venting, stripping, and storing of the latex when an alkali metal silicate is present.

Any of the alkali metal silicates are applicable for preventing precoagulation in accordance with this invention, particularly in the production of synthetic rubber latices prepared for example, by using an iron pyrophosphate activated polymerization system, but it is generally preferred to employ silicates of sodium and potassium. The alkali metal silicate may be any of the commercial silicates, for example, orthosilicates or metasilicates having varying proportions of sodium or potassium oxide to silicon dioxide content; or desired silicate mixtures may be prepared, such as by adding sodium metasilicate ($Na_2O.SiO_2$) in varying proportions to water glass ($Na_2O.4SiO_2$).

The amount of the silicate used must be sufficient to prevent precoagulation. Ordinarily from 0.1 to 2.0 parts by weight of the anhydrous silicate per 100 parts by weight of rubber solids present in latex is sufficient. Of course correspondingly larger quantities of a hydrated silicate would be employed. It has been found, however, that the stability of the latex of the type disclosed herein decreases upon standing. Hence more metal silicate within the range should be used if the silicate is added when the latex is to be stored for an appreciable period of time. When an alkali metal silicate is added to the polymerization recipe, or during the course of the reaction, the concentration of silicate in the aqueous phase is low, usually in the range from 0.004 to 0.012 mol per cent. In a polymerization system, for example, when an aqueous phase of 180 parts by weight based on 100 parts by weight of monomers is present, very satisfactory results are obtained when 0.21 part of anhydrous sodium metasilicate by weight (or 0.5 part $Na_2SiO_3.9H_2O$) based on 100 parts of monomers is charged with the other ingredients prior to carrying out the polymerization. This quantity of silicate, based on the aqueous phase, is 0.0009 mol per cent. When operating with high solids latex recipes, a smaller amount of aqueous phase is present and the weight of alkali metal silicate charged will therefore be correspondingly smaller in order to keep the concentration with respect to the aqueous phase within the range stated.

As indicated heretofore the silicate stabilizers of this invention are applicable to the low temperature emulsion polymerization processes, where precoagulation is most pronounced. The alkali metal silicates are particularly applicable to low temperature latices prepared at temperatures in the range of from about 0° C. to about 15° C. and preferably at temperatures not to exceed 10° C.

Unsaturated organic compounds to which this invention relates generally contain the characteristic structure $CH_2=C<$ and, in most cases, have at least one of the disconnected valences attached to an electronegative group, that is, a group which increases the polar character of the molecule such as a chlorine group or an organic group containing a double or triple bond such as vinyl, phenyl, nitrile, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene, (2-chloro-1,3-butadiene) bromoprene, methylchloroprene (2-chloro-3-methyl-1,3-butadiene), and the like; aryl olefins such as styrene, various alkyl styrenes, p-chlorostyrene, p-methoxystyrene, alphamethylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alphacholoroacrylate, methyl methacrylate, ethyl methacrylate, butyl methacrylate, methyl ethacrylate, acrylonitrile, methacrylonitrile, methacrylamide and the like; methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

As emphasized hereinbefore, this invention is concerned with recipes containing a ferrous complex, particularly the iron pyrophosphate recipes. These iron compounds are preferably prepared by admixing a ferrous salt, such as ferrous sulfate, with a pyrophosphate of an alkali metal, such as sodium or potassium, with water and heating this mixture, preferably for the length of time required for maximum activity. A reaction occurs between the salts, as evidenced by the formation of a grayish-green precipitate. When preparing the activator the mixture is generally heated above 122° F., for variable periods depending upon the temperature. For example, if the mixture is boiled, a period of twenty minutes or less is sufficient to produce the desired activity, and the time of boiling may even be as low as 30 seconds. One convenient method of operation involves maintaining the temperature of the activator solution at about 140° F. for a period of heating ranging from 10 to 30 minutes. Prior to heating the activator mixture the vessel is usually flushed with an inert gas such as nitrogen. In general it is preferred to heat the mixture below the boiling point, say at a temperature about 130° to 165° F.

In cases where the activator is prepared just prior to use, it is generally employed in the form of an aqueous dispersion as described above. However, the solid activator may be isolated and the crystalline product used, and it is preferred in this form in some instances. Subsequent to heating the activator mixture, it is cooled to about room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the butadiene. This crystalline material is believed to be a sodium ferrous pyrophosphate complex, such as might be exemplified by the formula $2Na_2FeP_2O_7 \cdot Na_4P_2O_7$, or perhaps $Na_2FeP_2O_7$. In any event the complex, whatever its composition, is one active form of ferrous iron and pyrophosphate which can be successfully used in our invention. It may be incorporated in the polymerization mixture as such, or may be dispersed in water. Other forms of multivalent metal, e. g., copper, and pyrophosphate may also be used, so long as there is present in the reacting mixture a soluble form of a multivalent metal, capable of existing in two valence states and present primarily in the lower of two valence states, and a pyrophosphate.

The amounts of activator ingredients to be charged in an iron pyrophosphate recipe are usually expressed in terms of butadiene charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 milimols based on 100 parts by weight of monomers; however the narrower range of 0.2 to 2.5 millimols is more frequently preferred. The mol ratio of ferrous salt to alkali metal pyrophosphate can be between 1 to 0.2 and 1 to 3.5 with a preferred ratio between 1 to 0.35 and 1 to 2.8.

In iron pyrophosphate systems the organic peroxide used as the oxidant component of the polymerization catalyst should have solubility properties such that the major portion of it is present in the liquid monomer phase, rather than in the aqueous medium, under the polymerization conditions. In general, two groups of organic peroxides can be used, those having the formula ROOH, known as hydroperoxides or hydroperoxymethanes, and those having the formula ROOR, where R in each instance is an organic radical. These two groups are not equivalents, however, and the hydroperoxides are preferred. The preferred hydroperoxides can be represented by the formula RR'R"COOH wherein R is selected from the group consisting of hydrogen and organic radicals, and each of R' and R" is an organic radical, or R'R" together comprise a tetramethylene or pentamethylene group forming with the R—COOH a cyclopentyl- or cyclohexylhydroperoxide. Each of R, R' and R" can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i. e., mercapto compounds and thioethers), and halogen compounds. Examples of such hydroperoxides include diisopropyl hydroperoxide (isopropyl (dimethyl) hydroperoxymethane), cumene hydroperoxide (phenyl (dimethyl) hydroperoxymethane), 1-methyl-1-hydroperoxy-cyclopentane, tetralin hydroperoxide, phenylcyclohexane hydroperoxide, octahydrophenanthrene hydroperoxide, diisopropylbenzene hydroperoxide (dimethyl (isopropylphenyl) hydroperoxymethane), methylethyl (ethoxyphenyl) hydroperoxymethane, methyldecyl (methylphenyl) hydroperoxymethane, dimethyldecylhydroperoxymethane, methylchlorophenylphenylhydroperoxymethane, and tertiarybutylisopropylbenzene hydroperoxide (dimethyl (tertiary - butylphenyl) hydroperoxymethane). Such hydroperoxides can be easily prepared by simple oxidation, with free oxygen, of the corresponding hydrocarbon or hydrocarbon derivative, i. e., of the parent trisubstituted methane. The compound to be oxidized is placed in a reactor, heated to the desired temperature, and oxygen introduced at a controlled rate throughout the reaction period. The mixture is agitated during the reaction which is generally allowed to continue from about one to ten hours. The temperature employed is preferably maintained between 50 and 160° C., although in some instances it might be desirable to operate outside this range, that is, at either higher or lower temperatures. At the conclusion of the reaction the oxidized mixture may be employed as such, that is, as a solution of the hydroperoxide composition in the parent compound, or unreacted compound may be stripped and the residual material employed. The major active ingredient in such a composition is the monohydroperoxide, or a mixture of monohydroperoxides. The hydroperoxide group appears to result from introduction of two oxygen atoms between the carbon atom of the trisubstituted methane and the single hydrogen atom attached thereto. Where there is another similar grouping in the molecule, the usual method of production just outlined appears to produce only the monohydroperoxide even though a dihydroperoxide appears to be structurally possible. Thus, in a simple case, from such an oxidation of diisopropylbenzene the primary product appears to be dimethyl(isopropylphenyl)hydroperoxymethane.

One large group of these hydroperoxymethanes is that group in which each of the three substituent groups is a hydrocarbon radical. One of the subgroups of these compounds is the alkaryl-dialkyl hydroperoxymethanes, in which the two alkyl groups are relatively short, i. e., have from one to three or four carbon atoms each, including dimethyl(tertiary-butylphenyl)hydroperoxymethane, dimethyl(diisopropylphenyl)hydroperoxymethane, dimethyl(isopropylphenyl)hydroperoxymethane, dimethyl(dodecylphenyl)hydroperoxymethane, dimethyl(methylphenyl)hydroperoxymethane, and corresponding methylethyl and diethyl compounds, and the like. Another subgroup includes at least one long alkyl group directly attached to the hydroperoxymethane, such as methyldecyl(methylphenyl)hydroperoxymethane, ethyldecylphenylhydroperoxymethane, and the like. Still another subgroup includes trialkyl compounds, such as dimethyldecylhydroperoxymethane, and the like; aralkyl compounds, such as 1-phenyl-3-methyl-3-hydroperoxybutane, can also be considered to be members of this group. A further subgroup includes alkyldiaryl compounds, such as methyldiphenylhydroperoxymethane, methylphenyltolylhydroperoxymethane, and the like. A further subgroup is the triaryl compounds, such as triphenylhydroperoxymethane, tritolylhydroperoxymethane, and the like. A further subgroup comprises cyclopentyl and cyclohexyl hydroperoxides, such as result from oxidation of cyclohexane, methylcyclopentane, and phenylcyclohexane, and compounds containing condensed ring structures such as 1,2,3,4,4a,9,10,10a-octahydrophenanthrene, which forms the corresponding hydroperoxide upon oxidation, etc. The organic hydroperoxides preferably will have a total of not more than thirty carbon atoms per molecule, and the most active hydroperoxides usually have at least ten to twelve carbon atoms per molecule. Mixtures of these hydroperoxides can be used, as desired.

The amount of organic hydroperoxide used to obtain an optimum reaction rate will depend upon the polymerization recipe employed and upon the specific reaction conditions. The amount is generally expressed in millimols per 100 parts of monomers, using in each instance the same units of weight throughout, i. e., when the monomeric material is measured in pounds the hydroperoxide is measured in millipound mols. The same is true for other ingredients in the polymerization recipe. The optimum rate of polymerization is usually obtained with the amount of hydroperoxide between 0.01 and 10 millimols per 100 parts by weight of monomers.

If a modifier is employed in the recipe it is preferably an alkyl mercaptan, and may be of primary, secondary, or tertiary configuration, and generally ranges from $C_8$ to $C_{16}$ compounds, but may have more or fewer carbon atoms per molecule. Mixtures or blends of these mercaptans are also frequently desirable and in many cases may be preferred to the pure compounds. The amount of modifier necessary to yield a polymer having an uncompounded Mooney viscosity within the desired range will vary depending, among other things, upon the particular recipe being used and upon the modifier (either pure mercaptan or a blend of several mercaptans) present in the recipe. The determination of the necessary amount of modifier in each case is within the skill of the art and is generally in the range of 0.2 part to 1 part modifier per hundred parts of butadiene. In general, less modifier is needed to obtain the desired Mooney viscosity in the case of lower molecular weight mercaptans than with higher molecular weight mercaptans. Other modification agents known to the art, for example, dialkyl dixanthogens, diaryl mono- and di-sulfides, tetraalkyl thiuram mono- and di-sulfides, and mercaptothiazoles, can also be used to advantage in the process of our invention.

Emulsifying agents suitable for use in the practice of our invention include fatty acid soaps, e. g., potassium laurate and potassium oleate, rosin acid soaps, and mixtures of fatty acid and rosin acid soaps. However other emulsifying agents, such as nonionic emulsifying agents, salts of alkyl aromatic sulfonic acids, alkyl sulfates, and the like which produce favorable results under the conditions of the reaction, can also be used in practicing our invention, either alone or in admixture with soaps. The amount and kind of emulsifier used to obtain optimum results is somewhat dependent upon the particular recipe being used, the relative amounts of monomeric material and aqueous phase, and like variables. Usually an amount between about 0.3 and 5 parts per 100 parts of monomers will be found to be sufficient, determination of the best amount for any given recipe being within the skill of the art.

In an iron pyrophosphate or other ferrous complex system such as is contemplated herein, the presence of a sugar or similar reducing agent is optional, although use of such material is generally preferred. Suitable reducing agents (also known as activating agents) include fructose, dextrose, sucrose, benzoin, acetylacetone, ascorbic acid, sorbitol, benzaldehyde, and the like.

This invention is applicable for preventing precoagulation of latices prepared in the presence of amounts of aqueous phase ranging from 50 to 250 or more parts per 100 parts monomers by weight. The invention is also applicable to the production of "high solids" latices, that is, latices resulting from the use of an amount of aqueous medium in the lower part of the range, for example a ratio of aqueous phase to monomeric material between 0.5:1 to 1:1 and the extent of conversion in the higher range disclosed for example from 70 per cent conversion to complete conversion.

In preparing a synthetic rubber in accordance with this invention one preferred method is to first prepare the activator. This comprises preparing a sugar solution, when such is used, and also a ferrous salt-potassium pyrophosphate solution and admixing the two solutions. More specifically, this preparation of the activator comprises dissolving the requisite quantity of a sugar, such as dextrose, together with a small amount of an alkali metal hydroxide, such as potassium hydroxide, or inorganic alkaline salts, in a specified amount of water and heating the mixture to a temperature of 60 to 80° C. for a few minutes, say not more than 30 minutes and preferably about 10 minutes. The requisite quantities of a ferrous salt, such as ferrous sulfate, and potassium pyrophosphate are each dissolved in a small quantity of water and the pyrophosphate solution then added to the ferrous salt solution. The mixture is warmed, with mild agitation and in the absence of an oxidising atmosphere, such as the free oxygen in air, to a temperature between 40° and 100° C., and preferably between 50 and 80° C., and immediately cooled to room temperature. When the sugar solution has cooled to room temperature, it is added to the ferrous sulfate-potassium pyrophosphate mixture. Care should be taken to keep free oxygen from contact with these solutions, even after cooling and mixing.

When the above described activator is employed in a butadiene-styrene batch-type polymerization reaction, the emulsifier solution such as a rosin soap, containing a small amount of an alkali metal hydroxide and usually an electrolyte such as potassium chloride, sodium or potassium phosphate, and the like, is charged to the reactor followed by the addition of the activator. The styrene, containing the mercaptan modifier, is then introduced, followed by the butadiene and the temperature then adjusted to the level desired for polymerization.

The peroxide is finally added and polymerization effected with agitation of the reactants according to conventional techniques. The alkali metal silicate can conveniently be added at this stage. The examples following are illustrative of recipes employing iron pyrophosphate systems which are within the scope of this invention. The examples also show the stability against precoagulation induced by the process of this invention.

One convenient and very satisfactory method for measuring the stability of a latex is by titration with sodium chloride. In general in latices which show instability in the salt titration test precoagulum forms in the lines. The general procedure is to titrate at room temperature 50 milliliters of latex in a 250-milliliter container which is provided with a stirring means. The sodium chloride solution, usually 1 N, is added dropwise. In the event that this salt concentration causes serious interference on account of the formation of large masses of precoagulum, a different salt concentration can be used which will work more satisfactorily. As the end point is approached, the salt solution is added in small increments and agitation is stopped for a short period, say about 60 seconds, between additions. The titration of the latex with sodium chloride is continued until there is a complete breakdown of the emulsion resulting in the total precipitation of the polymer. The concentration of the sodium chloride in the latex (usually expressed as mols per liter) at the end point (coagulation point) is a measure of the stability of the latex; the higher this concentration, the greater the stabiliy of the latex toward electrolyte. When it is desired to express the result of a titration as relative stability, two latices of the same type are compared, i. e., one with and the other without a stabilizer, the one without a stabilizer being used as the control. The relative stability is calculated as follows:

Relative stability =

$$\frac{\text{Critical NaCl concentration of sample}}{\text{Critical NaCl concentration of control}}$$

Example I

A butadiene-styrene copolymer was prepared at 5° C. using the following recipe:

| | Parts by weight |
|---|---|
| Butadiene | 72 |
| Styrene | 28 |
| Water | 180 |
| Rosin soap, K salt[1] | 4.7 |
| pH soap solution | 11.0 |
| Cumene hydroperoxide, (CHP) 100% | 0.1 |
| Potassium hydroxide | 0.13 |
| Mercaptan blend[2] | 0.24 |
| Potassium pyrophosphate, K$_4$P$_2$O$_7$ | 0.177 |
| Ferrous sulfate, FeSO$_4$.7H$_2$O | 0.14 |
| Dextrose | 1.0 |
| Trisodium phosphate, Na$_3$PO$_4$.12H$_2$O | 0.5 |
| Sodium salt of condensed alkyl aryl sulfonic acid[3] | 0.1 |
| Sodium metasilicate, Na$_2$SiO$_3$.9H$_2$O | 40.5[4] |

[1] Dresinate 214, a potassium salt of a rosin acid.
[2] A blend of tertiary C$_{12}$, C$_{14}$ and C$_{16}$ aliphatic mercaptans in a ratio of 3 : 1 : 1 parts by weight.
[3] Daxad–11.
[4] 0.0009 mol per cent based on aqueous phase.

The activator solution was prepared by first dissolving the ferrous sulfate in 10 parts water containing sufficient 5 per cent sulfuric acid to give a solution of pH 3.5 and then adding the potassium pyrophosphate. This mixture was heated to 60° C. and then cooled immediately to room temperature. The dextrose and 0.04 part potassium hydroxide were dissolved in 40 parts water and this mixture digested at 71° C. for 30 minutes after which it was cooled to 49° C. A mixture of the rosin soap, the remainder of the potassium hydroxide, Daxad–11, trisodium phosphate, and sodium metasilicate in 30 parts water was then added to the digested dextrose solution and this mixture diluted with 100 parts water. Prior to charging the ingredients, the reactor was purged with nitrogen. The emulsifier mixture was charged first followed by the mercaptan dissolved in the styrene. The temperature was then adjusted to 5° C. after which the butadiene was introduced followed by the cumene hydroperoxide and finally the activator solution. After a 10 hour reaction period a 61.6 per cent conversion was obtained. The latex contained no precoagulum and had a relative stability of 2.31 (as determined by the sodium chloride titration method) in contrast to a relative stability of 1.00 for a latex prepared by the same method except that no sodium metasilicate was present in the polymerization recipe. The pH of the vented latex was 10.02 and of the stripped latex 9.82. There is very little decrease in the pH of the latex when sodium metasilicate is present.

Example II

The following recipe is employed for the preparing of a butadiene-styrene copolymer latex:

| | Parts by weight |
|---|---|
| Butadiene | 70.5 |
| Styrene | 29.5 |
| Water | 198.4 |
| Dresinate 214 | 4.5 |
| Cumene hydroperoxide | 0.1 |
| NaOH | 0.1 |
| Tert-dodecyl mercaptan | 0.175 |
| K$_4$P$_2$O$_7$ | 0.17 |
| FeSO$_4$.7H$_2$O | 0.12 |
| Dextrose | 1.0 |
| Na$_3$PO$_4$.12H$_2$O | 0.5 |
| Triton R 100[1] | 0.12 |
| Temperature 41° F. | |

[1] Neutral sodium salt of a condensed aryl sulfonic acid.

Subsequent to polymerization the latex was divided into several portions and variable amounts of sodium metasilicate were added with one portion containing no stabilizing agent being reserved for a control. Stability of each sample was determined by the sodium chloride titration method. The following data illustrate the effectiveness of sodium metasilicate as a latex stabilizer when employed with this recipe:

| Additive | Parts/100 Solids | D Critical NaCl Concn., Mols/Liter | Relative Stability |
|---|---|---|---|
| None, control | 0 | 0.288 | 1.00 |
| Na$_2$SiO$_3$ | 0.5 | 0.451 | 1.57 |
| Na$_2$SiO$_3$ | 1.0 | 0.644 | 2.24 |
| Na$_2$SiO$_3$ | 1.5 | 0.734 | 2.55 |

Similar results are obtained when the latex is prepared by copolymerization of butadiene with styrene at 5° C. in an iron pyrophosphate activated sugar-free recipe.

Example III

Latex stability tests were performed, by the sodium chloride titration method, on samples of latex prepared according to the recipe of Example II. Samples of sodium silicate to be used as the latex stabilizer were prepared by mixing water glass (a 40 per cent solution of Na$_2$O.4SiO$_2$) and sodium metasilicate (Na$_2$SiO$_3$) in varying proportions in order to vary the ratio of sodium oxide to silica. The following results were obtained:

| Additive | Na$_2$SiO$_3$ Parts/100 parts Solids | Na$_2$O.4SiO$_2$ Parts/100 parts Solids | pH | Critical NaCl Concn., Mols/Liter | Relative Stability |
|---|---|---|---|---|---|
| None | 0.0 | 0.0 | 8.56 | 0.385 | 1.00 |
| Na$_2$O:1.8SiO$_2$ | 0.5 | 0.0 | 10.86 | | 1.67 |
| Na$_2$O:1.27SiO$_2$ | 0.52 | 0.31 | 10.95 | 0.729 | 1.90 |
| Na$_2$O:1.74SiO$_2$ | 0.52 | 0.62 | 10.86 | 0.736 | 1.91 |
| Na$_2$O:2.11SiO$_2$ | 0.52 | 1.24 | 10.82 | 0.700 | 1.82 |
| NaOH | 0.0 | 0.0 | 10.86 | | 1.56 |

Example IV

The following recipe was employed for the preparation of a butadiene-styrene copolymer latex at 5° C.:

| | Parts by weight |
|---|---|
| Water | 110 |
| Butadiene | 70 |
| Styrene | 30 |
| Fatty acid soap, K salt [1] | 3.0 |
| Cumene hydroperoxide | 0.2 |
| Potassium hydroperoxide | 0.13 |
| Dextrose | 1.0 |
| KCl | 0.4 |
| Daxad-11 [2] | 0.2 |
| $K_4P_2O_7$ | 0.354 |
| $FeSO_4.7H_2O$ | 0.28 |
| Tert-$C_{16}$ mercaptan | 0.36 |

Booster added at 16.6 hours, 30 per cent solids.

| | |
|---|---|
| Water | 21.6 |
| Fatty acid soap, K salt [1] | 2.0 |
| KOH | 0.02 |
| KCl | 0.2 |
| $K_4P_2O_7$ | 0.177 |
| $FeSO_4.7H_2O$ | 0.14 |
| Cumene hydroperoxide | 0.1 |

[1] Potassium Office Rubber Reserve soap.
[2] See Example I.

A 40.4 per cent solids latex was obtained in 31 hours (89.7 per cent conversion). The latex at blowdown had a pH of 9.5, compared to an initial pH of 11.1, and a small amount of precoagulum was found. The pH of the latex dropped to 8.5 during concentration to increase the solids content. Sodium metasilicate was then added in such quantity that the pH was raised to 10.4. This treatment stabilized the latex sufficiently that concentration was continued to a solids content of 57.6.

Example V

A high solids latex was prepared at 5° C. according to the following recipe:

| | Parts by weight |
|---|---|
| Water | 65 |
| Butadiene | 90 |
| Styrene | 10 |
| Fatty acid soap, K salt [1] | 2.75 |
| Mercaptan blend [2] | 0.18 |
| Tert-butylisopropylbenzene hydroperoxide | 0.125 |
| KOH | 0.07 |
| KCl | 0.50 |
| Dextrose | 0.50 |
| $K_4P_2O_7$ | 0.177 |
| $FeSO_4.7H_2O$ | 0.14 |
| Daxad-11 [3] | 1.0 |

Booster at 15 hours, 33 per cent solids.

| | |
|---|---|
| Water | 5.0 |
| Dextrose | 0.5 |
| $K_4P_2O_7$ | 0.177 |
| $FeSO_4.7H_2O$ | 0.14 |
| Tert-butylisopropylbenzene hydroperoxide | 0.125 |

Sodium metasilicate at 24 hours, 40.8 per cent solids.

| | |
|---|---|
| Water | 1.0 |
| $Na_2SiO_3.9H_2O$ | [4] 0.3 |

[1] See Example IV.
[2] A blend of tertiary $C_{12}$, $C_{14}$, and $C_{16}$ aliphatic mercaptans in a ratio of 3:1:1 parts by weight.
[3] See Example I.
[4] 0.0015 mol per cent based on aqueous phase.

When this recipe is employed without the addition of sodium metasilicate, there is an excessive drop in the pH during the course of the polymerization. In the presence of sodium metasilicate, polymerization was continued for 60 hours (84.3 per cent) to give a latex containing 50 per cent solids. The temperature was raised to 10° C. at 50 hours (48 per cent solids). No precoagulum was found in the reactor. Stripping was accomplished by passing nitrogen through the latex. The latex had a final solids content of 55 per cent.

Example VI

The following recipe was employed for the preparation of a butadiene-styrene copolymer latex:

| | Parts by weight |
|---|---|
| Butadiene | 72 |
| Styrene | 28 |
| Water | 180 |
| Dresinate 214 | 4.7 |
| CHP | 0.1 |
| KOH | 0.13 |
| Mercaptan blend [1] | 0.24 |
| $K_4P_2O_7$ | 0.177 |
| $FeSO_4.7H_2O$ | 0.14 |
| Dextrose | 1.0 |
| $Na_3PO_4.12H_2O$ | 0.5 |
| Daxad-11 [1] | 0.1 |
| Temperature 41° F. | |

[1] As in Example I.

Latex stability tests were performed by the sodium chloride titration method and the following results were obtained:

| Sodium Metasilicate, Parts/100 Parts Solids | Critical NaCl Concentration, Mols/Liter | Relative Stability |
|---|---|---|
| 0.00 | 0.412 | 1.00 |
| 0.08 | 0.464 | 1.13 |
| 0.15 | 0.569 | 1.38 |
| 0.30 | 0.731 | 1.78 |
| 0.50 | 0.828 | 2.01 |
| 1.00 | 0.835 | 2.03 |
| 1.50 | 0.818 | 1.99 |
| 2.00 | 0.804 | 1.95 |

The preceding examples clearly show the advantages of our invention in preventing precoagulation. The examples show that latices containing 65 to 200 parts by weight of aqueous phase per 100 parts by weight monomers are readily stabilized. By the process of this invention the desired stabilizing effect is also produced in high solids recipes.

Obviously many modifications or variations as hereinbefore set forth may be made without departing from the spirit and scope of the invention.

We claim:
1. The process of producing a stabilized latex free from the presence of precoagulum which comprises polymerizing a major portion of butadiene and a minor portion of styrene in aqueous emulsion at a temperature below 10° C. in the presence of an organic peroxide as catalyst and iron pyrophosphate as activator, incorporating in said emulsion 0.1 to 2.0 parts by weight per 100 parts of solid in the resulting latex of an alkali metal silicate, and maintaining the emulsion at a pH of not less than 10.0 as the polymerization proceeds.

2. A process in accordance with claim 1 in which the alkali metal silicate is sodium silicate.

References Cited in the file of this patent

UNITED STATES PATENTS

| | | |
|---|---|---|
| 2,034,531 | Kell | Mar. 17, 1936 |
| 2,101,089 | Novak | Dec. 7, 1937 |
| 2,393,261 | Peaker | Jan. 22, 1946 |
| 2,517,737 | Travis | Aug. 8, 1950 |

OTHER REFERENCES

Shearon et al., Ind. & Eng. Chem., vol. 40, No. 5, May 1948, pp. 769–777.